May 25, 1937.  C. W. BECK  2,081,729
SPOKE AND RIM CONNECTION
Original Filed Feb. 24, 1930   2 Sheets-Sheet 1
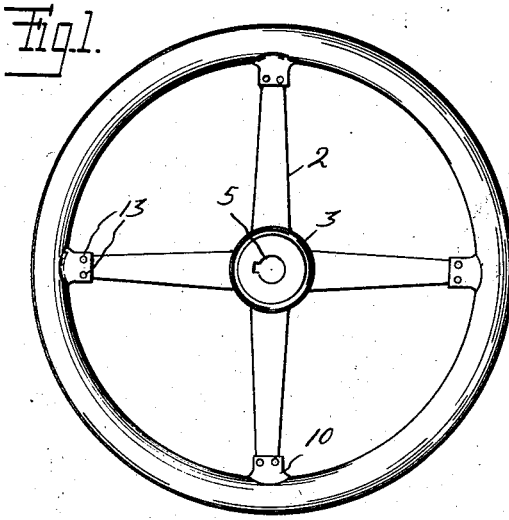
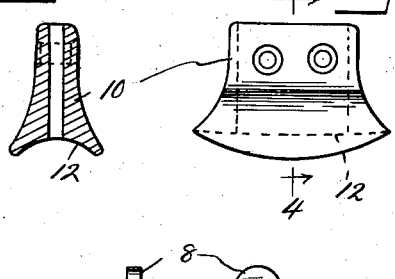
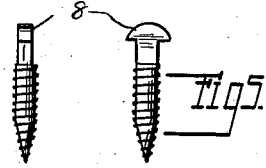
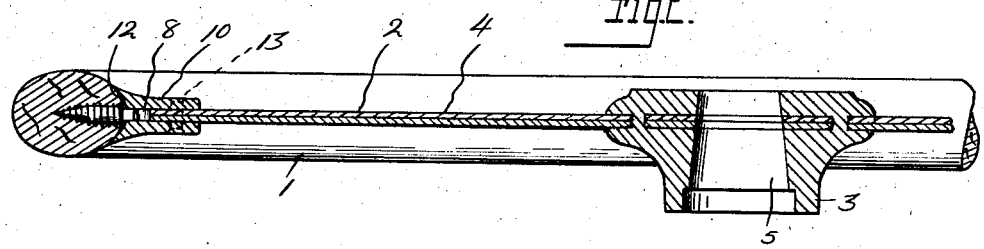
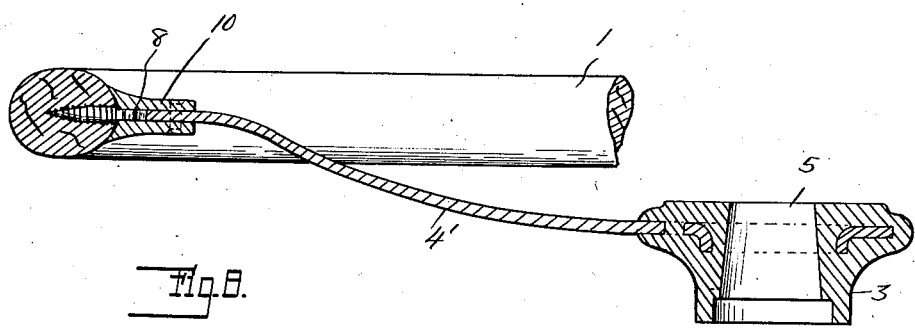
INVENTOR
Charles W. Beck
BY
*Whittemore, Hulbert, Whittemore & Belknap*
ATTORNEYS May 25, 1937.  C. W. BECK  2,081,729
SPOKE AND RIM CONNECTION
Original Filed Feb. 24, 1930   2 Sheets-Sheet 2
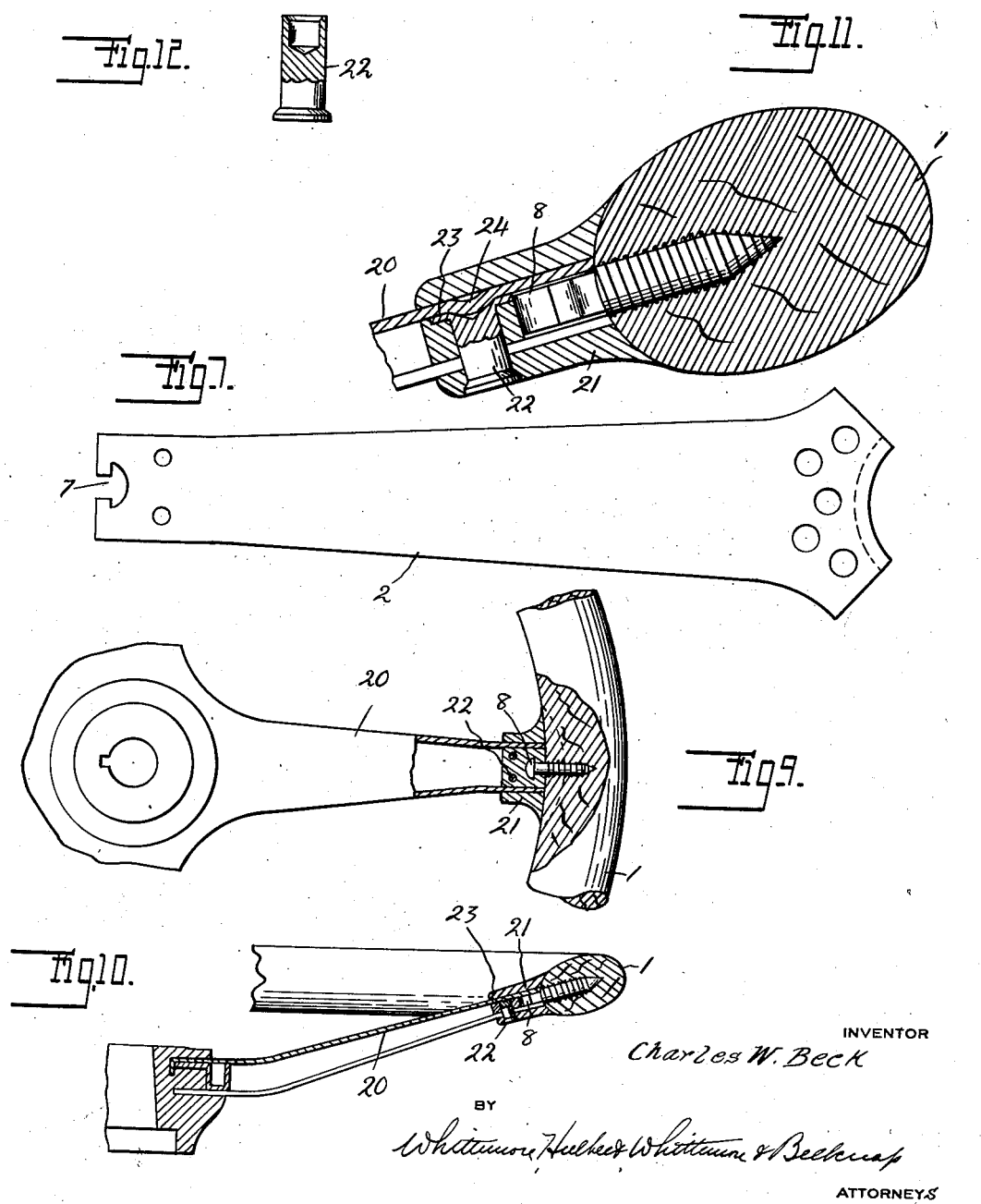
INVENTOR
Charles W. Beck
BY
Whittemore, Hulbert, Whittemore & Belknap
ATTORNEYS Patented May 25, 1937

2,081,729

UNITED STATES PATENT OFFICE 2,081,729

SPOKE AND RIM CONNECTION

Charles W. Beck, Toledo, Ohio, assignor, by mesne assignments, to Nellie M. Beck, Toledo, Ohio Application February 24, 1930, Serial No. 430,851
Renewed September 9, 1936

19 Claims. (Cl. 74—552)

This invention relates generally to steering wheels, particularly to the connections between the rim and spider arms thereof, and consists of certain novel features of construction, combinations and arrangements of parts that will be hereinafter more fully described and particularly pointed out in the appended claims.

This application constitutes a continuation in part of an application in my name filed January 16, 1928 and bearing Serial No. 247,218.

In the accompanying drawings,

Fig. 1 is a fragmentary top plan view of a wheel embodying my invention;

Fig. 2 is a fragmentary vertical sectional view through the wheel shown in Fig. 1;

Fig. 3 is a detail view of one of the alloy castings;

Fig. 4 is a longitudinal sectional view taken on the line 4—4 of Fig. 3;

Fig. 5 is a detail view of one of the screws;

Fig. 6 is an edge elevation of the construction shown in Fig. 5;

Fig. 7 is a detail top plan of one of the spider arms;

Fig. 8 is a fragmentary sectional view through a slightly modified construction;

Fig. 9 is a fragmentary top plan view of another modified wheel construction;

Fig. 10 is a fragmentary sectional view through the construction illustrated in Fig. 9;

Fig. 11 is an enlarged fragmentary sectional view of a portion of the construction shown in Fig. 9;

Fig. 12 is a detail fragmentary sectional view of one of the rivets shown in Figs. 10 and 11.

Referring now to the drawings, 1 is a rim, and 2 is a spider or wheel body of a steering wheel embodying my invention. As shown, the wheel 1 is formed of wood and is circular in form. The spider 2 is formed entirely of metal and comprises a hub 3 and a plurality of straight radially extending laminated spring metal arms 4. Preferably the hub 3 is a casting and has a tapered bore 5 for receiving the usual steering column (not shown) of a vehicle, while the arms 4 are preferably resilient and comprise two layers of spring steel.

In the present instance, the arms 4 are provided at their outer ends with substantially T-shaped slots 7 that receive substantially T-shaped heads 8 of screws 9 projecting inwardly from the rim 1. Preferably these T-shaped heads 8 are retained in the slots 7 by alloy castings 10 that are sleeved upon the arms 4 and have arcuate or concave ends 12 embracing the rim 1. Any suitable means such as the rivets 13 extending through the castings and arms may be used to hold the castings against longitudinal movement on the arms. Thus, in the specific embodiment herein illustrated, the heads 8 of the screws are free with respect to the members 10, to permit a limited relative rocking movement of spring spokes and rim, when said members are rigid castings or the like, as described. Said members 10 have a further function in extending the rim grip radially inward, as coverings for those portions of the spokes immediately adjacent to the rim, and they also act to damp the vibration of the outer ends of the resilient spokes, imparted from the steering post.

Because of the described construction and arrangement, the outer ends of all of the spokes are fixedly connected with the rim as to relative radial movement, the rim is capable of a relative axial or rocking movement in relation to the hub, through flexure of the spokes, during which the members 10 may rock upon the rim to a small extent, and the transmission of objectionable shock or vibration to the rim is avoided by a combination of this rocking movement, the resiliency of the spokes and the damping action of members 10 upon the spokes.

In Fig. 8 I have shown a slight modification in which the arms 4' are pressed from sheet metal and are curved longitudinally. Otherwise the construction and arrangement of parts are the same as in Figs. 1 to 7 inclusive.

In Figs. 9 to 12 inclusive I have shown another modification in which the arms 20 of the spider are formed of sheet metal but are tubular similar to those shown in my Patents Nos. 1,560,134 dated Nov. 3, 1925 and 1,591,269 dated July 6, 1926. With this construction the flat substantially T-shaped heads 8 of the screws are received in the open ends of the arms 20 and the castings 21 carried by these arms are held in place by rivets 22 of special design. Preferably before being applied these rivets 22 have tubular portions 23 at one end and when applied the portions 23 are flared or flanged laterally outwardly by suitable inwardly extending embossed portions 24 of the spider arms 20. In other words, the arrangement is such that the rivets 22 are automatically rigidly and permanently secured in place when they are driven against the embossed portions 24 of the arms.

I claim:

1. A built-up steering wheel comprising a hub, an annular rim, resilient spokes connected to the hub, and means connecting the outer ends of all of said spokes fixedly to the rim as to relative radial movement and permitting their limited relative axial rocking movement, said means including members embedded within the rim, and spoke-covering members extending the rim grip radially inward and fastened upon the spokes for damping the vibrations of their outer ends.

2. A built-up steering wheel comprising a hub, an annular rim, resilient spokes connected to the hub, spoke connecting means embedded within the rim, means to secure the spokes to the said connecting means in metal-to-metal engagement, and reinforcing members surrounding the parts of the spokes adjacent the rim and having outer ends abutting the adjacent parts of the latter and extending radially of the rim to prevent crystallization of said means which secure the spokes to the said connecting means upon flexing of the spokes.

3. A built-up steering wheel in accordance with claim 2, wherein the means to secure the spokes to the said connecting means embedded within the rim are movable relative thereto.

4. A built-up steering wheel in accordance with claim 2, wherein the inner ends of the reinforcing means which abut the rim have rocking engagement with the latter.

5. In a steering wheel, a rim, a spring metal spider arm, and a connection between said arm and rim preventing the transfer from said arm to the rim of shock received by said arm, including a member sleeved upon the arm and engaging the rim, and a headed element projecting inwardly from the rim and having the head thereof freely received within the arm and free with respect to the member aforesaid.

6. In a steering wheel, a rim, a resilient spider arm comprising two layers of spring steel and having a substantially T-shaped slot therein at one end thereof, and a connection between said arm and rim permitting the arm to move relative to the rim including a member sleeved upon the arm over the slot therein and engaging the rim, and a headed element projecting inwardly from the rim having a head thereof of substantially T formation freely received within the T-shaped slot in the arm between and free with respect to portions of the member aforesaid sleeved upon the arm.

7. In a steering wheel, a rim having a rounded inner surface, a spring metal spider arm having a slot therein at one end thereof, a casting sleeved upon the arm over the slot and having an arcuate end engaging the rounded surface of the rim, and a headed element projecting inwardly from the rim and having the head thereof received in the slot in the arm and free with respect to the casting whereby the arcuate portion of the casting may move vertically on the rounded surface of the rim.

8. In a steering wheel, the combination with a wheel rim and a spider arm, of a connection between said rim and arm including a part sleeved upon the arm and abutting the rim, and a headed element having a portion threadedly engaging the rim and having another portion extending longitudinally of and forming a loose connection with said arm within the part aforesaid.

9. In a steering wheel, the combination with a wheel rim and a spider arm, of a connection between said rim and arm including a screw having a shank threadedly engaging the rim and having a head projecting from the rim longitudinally of and disposed within a portion of the arm, and a part surrounding the head of said screw and the adjacent portion of said arm and retaining the head of said screw within the portion aforesaid of said arm.

10. In a steering wheel, the combination with a wheel rim and a spider arm, of a connection between said rim and arm including a part surrounding said arm and abutting said rim, and another part extending from the rim longitudinally of and forming a loose connection with the arm within the first mentioned part.

11. In a steering wheel, the combination with a wheel rim and spider arm, of a connection between said rim and arm including a member carried by the rim and having a portion having a loose engagement with said arm, concealing means for said connection, and means for holding said concealing means in position including a rivet extending transversely of said concealing means and having a recessed end receiving an embossed portion of said arm.

12. In a steering wheel, the combination with a wheel rim, of a screw extending at substantially right angles to the rim and having the shank thereof in said rim and having a flat substantially T-shaped head at one side of said rim, a spider arm having an aperture corresponding in shape to and receiving the head of said screw, said screw and said aperture forming a loose joint, and a covering for a portion of said arm abutting said rim and concealing and holding said screw head in said arm.

13. In a steering wheel, the combination with a wheel rim, of a screw extending at substantially right angles to the rim and having the shank thereof in said rim and having the head thereof at one side of said rim, a spider arm in alignment with said screw and having an aperture receiving the head thereof, a covering for a portion of the arm abutting the rim and concealing and loosely holding said screw head within said arm, and securing means for the covering including an element extending transversely of said covering and arm.

14. In a steering wheel, a rim, a spider arm, a loose joint between an arm end and the rim, and a sleeved member fastened on the outer end of said arm and in engagement with the rim whereby said arm end and sleeved member are permitted to rock or move relative to the rim.

15. In a steering wheel, a hub, a rim and flexible arms normally spacing said hub from said rim in concentric relation, said arms having a loose joint between their outer ends and the inner side of the rim and being yieldable transversely to the plane of said rim.

16. In a steering wheel, a rim, radial projections extending inwardly of said rim, a hub member and flexibly resilient spider arms, each arm having one end secured to the said hub and each arm having an oscillatory connection at its other end with one of said projections to permit movement of said arm, relative to the plane of the rim, for preventing transfer of shock from said arm to said rim, said arms and their pivotal connections normally maintaining said rim in concentric relation to said hub.

17. In a steering wheel, a rim, radial projections extending inwardly of said rim, a hub member and flexibly resilient spider arms having their inner ends secured to said hub and having an oscillatory connection at their outer ends with said projections to permit movement of said arms, relative to the plane of the rim, for preventing transfer of shocks from said arms to said rim, said arms and connections normally maintaining said rim in concentric relation to said hub, and coverings extending over said projections to said rim and concealing said projections and the connections of said spider arms therewith.

18. In a steering wheel, a rim, radial projections extending inwardly of said rim, a hub member and flexibly resilient spider arms having their inner ends secured to the said hub and having an oscillatory connection at their outer ends with said projections to permit movement of said arms, relative to the plane of the rim, for preventing transfer of shocks from said arms to said rim, said arms and connections normally maintaining said rim in concentric relation to said hub, and coverings extending over said projections to said rim and concealing said projections and the connections of said spider arms therewith, said coverings being movable with said arms relative to said rim.

19. In a steering wheel, a hub, a rim, resiliently flexible spokes extending from said hub to the vicinity of the inner edge of said rim, inwardly extending projections on said rim connected to and co-operating with a portion of said spokes to prevent longitudinal movement of said spokes relative to said rim, and a covering extending from said rim over each projection and the end of the spoke engaged thereby.

CHARLES W. BECK.